Patented Oct. 15, 1929

1,732,015

UNITED STATES PATENT OFFICE

FELIX HOMBERG AND MAX LANDECKER, OF BARMEN, GERMANY, ASSIGNORS TO AMERICAN NUPLAX CORPORATION, OF NEW YORK, N. Y., A CORPORATION OF DELAWARE

PROCESS FOR THE PRODUCTION OF MOLDED MASSES

No Drawing. Application filed May 20, 1926, Serial No. 110,542, and in Germany July 7, 1925.

As is well known, blood is dried by two essentially different processes, one of which, passing beyond the coagulation temperature of the blood, produces dry blood (blood albumen) insoluble in water, while the other, remaining below the coagulation temperature, produces dry blood (blood albumen) soluble in water.

For the production of molded masses from blood the insoluble dry blood has hitherto been mainly used. The manufacture was carried out in such a manner that the insoluble blood was pressed or rolled without the addition of water and without addition of filling materials, in deep stamping molds and pressed into molded objects, by heat and pressure, which, after removal from the mold, for the most part, did not require subsequent treatment. The necessary pressing temperature is at least 120° C., and the specific pressure about 500 atmospheres, and the pressing period for thinner objects such as sheets, buttons, etc., amounted to at least three minutes.

Factories which supply this insoluble dry blood for molding purposes refer to it as "prepared dry blood for manufactures."

The molded masses produced from this insoluble raw material have many disadvantages. Above all, in spite of the long pressing period, high temperatures, and high pressures, they are not completely pressed even when of only slight thickness as 1-3 mm. Also they have too low an elasticity to be regarded as good artificial horn, and finally, even after hardening, they are affected by moisture and weather influences in such a manner that the products break and check on the surface after but a short time.

These unfavorable properties are mainly due to the fact that blood albumen which has already coagulated, that is, insoluble blood, is no longer capable, by subsequent treatment under heat and pressure of combining to form an elastic material so as to form a good artificial horn.

A very much better, and in fact a very desirable artificial horn, can, however, be obtained by the use of non-coagulated, that is, water soluble dry blood, when operating within specified conditions as hereinafter referred to.

It has already been proposed to use the water soluble or so called native dry blood as moldable material, but the conditions for its manufacture were not known, and had not even been determined. It is utterly impossible to produce useful molded masses from native dry blood, that is, water soluble blood, in the same manner as is usual with the insoluble dry blood.

As is well known, water soluble dry blood may be produced by spraying liquid blood into a current of warm air heated to a temperature of not over 75° C. The rapid evaporation of the water content of the blood reduces the temperature of the air very materially and leaves the blood in the form of a dry, water soluble powder.

If attempts are made to produce molded masses from commercial water soluble dry blood obtained in this manner, without further treatment, it will soon be ascertained that in spite of the use of high temperatures and high pressures, the molded objects will be only partly homogeneous and of such brittleness that when removed from the pressing apparatus they will easily break. The duration of pressing may be increased beyond every commercially permissible extent, and even then the brittleness remains and insufficient compression of thicker pieces occurs. It therefore appears to be quite impossible to use water soluble dry blood instead of the water insoluble dry blood under the same conditions of manufacture as prevail with the insoluble dry blood.

But not only in view of the brittleness and the poor homogenity of its products, does the water soluble, or native dry blood cause difficulties when treated commercially, but also its physical properties render it unsuitable for direct use. The powdery and specifically light consistency of this product, which is similar to that of maize flour, causes difficulties which cannot be overcome when filling the pressing molds, which difficulties are due to the fact that fillings of equal weight cannot be obtained either by pressing or by rolling. In view of the specific lightness of the material the pressing molds must be made so deep, in order to obtain the filling weight, that the thorough heating necessary would require too long a time to be at all commercially practicable.

All these difficulties and failures, which in previous years were met with when using the water soluble or native dry blood, for the production of molded masses, have led to the use of the insoluble dry blood, or the dry blood "prepared for manufactures", because it was not known how to produce useful masses from the water soluble, or native dry blood.

However, as already stated, excellent plastic masses may be produced from water soluble dry blood under certain conditions. We have found that by uniformly moistening the water soluble dry blood with water, its physical properties are changed, and it is converted into a more granular, sea-sand-like powder, which readily fills the ordinary molds. This moistened water soluble dry blood may be readily molded and produces molded objects of excellent quality. In order to obtain these results, the water soluble dry blood must be uniformly moistened, and this is extremely difficult of accomplishment.

It is only with moistened native dry blood that it is possible to obtain good artificial horn masses, the term native dry blood implying the product, water soluble dry blood, obtainable on the market, but hitherto incapable of successful use for the production of molded masses.

The extraordinary difficulties of moistening the native dry blood are due primarily to its very ready solubility in water.

If attempts are made to moisten water soluble dry blood with water, there are obtained at the places where the water is absorbed, sticky and tough lumps, which behave like soft rubber and adhere to the walls, bearings and mixing arms of the mixing machine, and will not under any circumstances, give up part of their absorbed water so as uniformly to distribute it to the remaining soluble dry blood. It is quite immaterial whether the water be used heated (40–50° C.), at normal temperature (18–20° C.), or cooled (1–10° C.). After some period of mixing, the adhesive and tough lumps are converted into more or less small plates which have become coated with a layer of dry blood, and remain in this condition despite further mixing.

It has, however, now been found that the difficulties of moistening of water soluble, or native dry blood are obviated if water soluble substances are added to the water used for moistening. It has been found that not only salts, such as sodium chloride, iron sulphate, lead acetate, etc.; acids such as sulphuric acid, hydrochloric acid and boric acid, and alkalies such as ammonia, barium hydroxide, etc., exert a good action, but that colloids, such, for example, as glue, (gumi arabicum) or vegetable colloids, as Iceland moss, sea weed, etc., can be used. If non-colloids are used it may be mentioned that various percentages are necessary in order to obtain the desired effect. For example a 1% (by weight) common salt solution acts properly, whereas a 1/10 of 1% (by weight) zinc sulphate solution exhibits very good results. Also alcohols, such as methyl, ethyl, propyl, etc., the corresponding esters, and in fact all water soluble substances have the effect, upon addition to the moistening water, of preventing stickiness of the soluble dry blood, so that with the usual mixing machines, used generally in this manufacture, the uniform and thorough moistening of the water soluble blood is easily effected.

The choice of soluble additions to the water depends solely upon the kind of object, as sheets, rods, knobs, combs, buttons, etc., which is being produced. If an object is to be hardened, for example, it is more desirable to add to the water such substances, as zinc sulphate, copper sulphate, etc., as will act in small quantity. If the object is not to be hardened, or if it is but little subjected to weather influences, then substances such as sodium chloride, sodium bisulphate, etc., may be used, such substances only exhibiting their action in larger quantities, that is, at least 1% by weight. It is immaterial whether these substances have an alkaline, neutral, or acid reaction. In contradistinction to the moistening with water alone, which is impracticable for reasons hereinbefore set forth they render the moistening commercially possible.

The quantity of the water to be added depends upon the kind of dry blood used, for example, the natural moisture content of the dry blood, which in the case of ordinary, commercial water soluble dry blood may range from 6% to 12% by weight, the kind of object to be produced that is relatively thick or thin, and the proportionate quantity of the filling media that may possibly be added.

It has been found that in some instances the addition of 1% or less of moisture, produces a sufficient effect for making a good artificial horn; as a rule, however, the most favorable results are obtained by the addition of from 3% to 25% of moisture. In particular cases, for instance, in making exceptionally large or heavy objects, an addition of above 25% of water may be necessary, but this is not the general rule. The total water content is the sum of the water left in the water soluble dry blood during its manufacture and the water added in accordance with our invention. This total water content may range from about 15% to about 30% or more for good results, depending upon the factors above stated. The total water content must not be permitted to reach that quantity which will cause the blood to become pasty. It will be understood that the natural water content or water soluble dry blood depends in the first instance upon its method of preparation, and that the blood tends to lose moisture on being stored. In practical commercial operations, it is always necessary to add a considerable amount of water to the blood before pressing.

The production of good molded masses from commercial water soluble, or native, dry blood is therefore only rendered possible by moistening with water; and it is easily recognized, from the difficulties mentioned above, just why insoluble dry blood hitherto always formed the starting material.

With the moistening, there is not only obtained the sole possibility of producing a really good artificial horn mass, but the conditions of commercial manufacture are much more favorable, in that this moistened water soluble dry blood produces perfect molded masses, at a pressing temperature of 85–110° C., at a specific pressure of about 300 atmospheres, and a pressing period of only one minute for the thinner objects (up to 2–3 m/m thickness) whereas, as is well known, formerly temperatures of 120–140° C., specific pressures of about 500 atmospheres, and pressure periods of three minutes were necessary for such thinner objects. There is therefore obtained an enormous technical and economic advantage in comparison with previous methods.

Coloring matter, such as dyes or dying substances, as percholride of iron, copper sulphate, etc. may also be added to the moistening water for converting, for example, the normal brownish black of the moulded masses, pressed from blood by heat and pressure, into a deep black.

Finally, the procedure may also be such that the soluble substance or substances as enumerated above, instead of being added with the water, are previously intimately mixed with the dry blood, and the necessary water for moistening is then added to the mixture.

By means of the process according to this invention, it is even possible to produce rods from blood by means of the extrusion press, which same absolutely could not be done hitherto.

Example 1.—Rods 100 kilos of commercial, water soluble dry blood were moistened with 22 kilos of a water solution, containing 2% by weight of zinc chloride. This mixture was put into a regular mixing mill which was run for 6 hours in order to get an intimately mixed powder, after which the resulting powder was put into a usual extrusion press, where it was pressed under 300 atms. pressure, and at 100° C. temperature. At the mouth-piece of the press appeared the desired rod, of a deep black color, which was then hardened by formaldehyde solution in a known manner. The rods were suitable for the manufacture of all kinds of turned objects, such as handles for umbrellas, canes, and knives, beads, chess-men, ornaments, etc.

Example 2.—Buttons and buckles 100 kilos of commercial, water soluble dry blood were moistened with 15 kilos of a water solution containing 1/10 of 1% by weight of zinc sulphate and the materials were mixed as in Example 1, above. After discharging from the mixing mill, the powder was filled into the desired molds and pressed in a usual hydraulic press for 1½ minutes under 200 atms. pressure, and 106° C. temperature and after the cooling of the molds, the desired buttons and buckles, in a deep black color, were taken out and were hardened with formaldehyde, in the usual manner.

Example 3.—Ornaments, radio discs, etc.

100 kilos of commercial, water soluble dry blood were moistened with 15 kilos of a water and dye solution, (.05% malachite green, by weight, in water) and the materials were mixed as in Example 1, above. After discharging from the mixing mill, the powder was filled into the desired molds and pressed in a usual hydraulic press for 1½ mins. under 200 atms. pressure, and 106° C. temperature, and resulted in a deep black colored object, which was then hardened as well known, in formaldehyde solution.

It will be understood that the specific details are given by way of explanation rather than of limitation.

What we claim is:—

1. A process for the production of molded masses from water soluble dry blood, by hot pressing, comprising uniformly moistening water soluble dry blood with water, in the presence of additional water soluble substance which promotes the uniform distribution of water through the mass, the quantity of water being sufficient to cause the mass to coalesce into a compact cohesive body when molded, but insufficient to alter the powder-like nature of the mixture, and then molding the mixture into a solid body under heat and pressure.

2. A process for the production of molded masses, comprising intimately mixing water soluble blood powder with a dilute water solution of a salt of a heavy metal, whereby the blood powder is uniformly moistened and its molding capability enhanced, the amount of water in the mixture being insufficient to destroy its powdery character, and then molding the powder into a solid body under heat and pressure.

In testimony whereof we have signed our names to this specification.

FELIX HOMBERG.
MAX LANDECKER.